(12) United States Patent
Roy et al.

(10) Patent No.: US 9,077,093 B1
(45) Date of Patent: Jul. 7, 2015

(54) MAGNETIC ROTATION ACTUATOR

(71) Applicant: APPLE INC., Cupertino, CA (US)

(72) Inventors: Mathieu P. Roy, Sunnyvale, CA (US);
Cesar Lozano Villarreal, Santa Clara, CA (US); Jean-Marc Gery, Los Angeles, CA (US); Vikas K. Sinha, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/260,090

(22) Filed: Apr. 23, 2014

(51) Int. Cl.
*H01R 13/08* (2006.01)
*H01R 13/44* (2006.01)
*H02K 49/10* (2006.01)
*H01R 35/04* (2006.01)

(52) U.S. Cl.
CPC ............... *H01R 13/08* (2013.01); *H01R 13/44* (2013.01); *H02K 49/10* (2013.01); *H01R 35/04* (2013.01)

(58) Field of Classification Search
CPC .................................. H02K 49/10; H01R 35/04
USPC .......................................... 439/131, 172, 174
See application file for complete search history.

(56) References Cited

U.S. PATENT DOCUMENTS

| | | | | |
|---|---|---|---|---|
| 2,790,095 A | * | 4/1957 | Peek et al. | 310/103 |
| 3,703,653 A | * | 11/1972 | Tracy et al. | 310/24 |
| 3,967,146 A | * | 6/1976 | Howard | 310/80 |
| 4,011,477 A | * | 3/1977 | Scholin | 310/80 |
| 5,415,140 A | * | 5/1995 | Rigazzi | 123/197.1 |
| 6,062,880 A | * | 5/2000 | Skuza | 439/131 |
| 6,126,460 A | * | 10/2000 | Wu | 439/131 |
| 6,184,605 B1 | * | 2/2001 | Kim | 310/156.26 |
| 6,274,959 B1 | * | 8/2001 | Uchiyama | 310/152 |
| 6,312,271 B1 | * | 11/2001 | Tseng | 439/131 |
| 6,325,646 B1 | * | 12/2001 | Uemura et al. | 439/131 |
| 6,454,578 B1 | * | 9/2002 | Yao | 439/131 |
| 6,494,727 B2 | * | 12/2002 | Wen-Ching | 439/131 |
| 6,501,357 B2 | * | 12/2002 | Petro | 335/229 |
| 6,544,051 B1 | * | 4/2003 | Su | 439/131 |
| 6,592,406 B2 | * | 7/2003 | Liu | 439/620.31 |
| 6,632,098 B1 | * | 10/2003 | Wong et al. | 439/131 |
| 6,641,412 B2 | * | 11/2003 | Kitagawa et al. | 439/131 |
| 6,700,248 B2 | * | 3/2004 | Long | 310/80 |
| 6,722,900 B2 | * | 4/2004 | Segawa et al. | 439/131 |
| 6,780,033 B2 | * | 8/2004 | Liu | 439/172 |
| 6,780,034 B2 | * | 8/2004 | Shiroshita et al. | 439/174 |
| 6,781,270 B2 | * | 8/2004 | Long | 310/90.5 |
| 6,790,062 B1 | * | 9/2004 | Liao | 439/171 |
| 6,793,509 B2 | * | 9/2004 | Chen | 439/136 |

(Continued)

OTHER PUBLICATIONS

Dongguan Shangge Electronic Co., Ltd., "Foldable pins UK USB charger adaptor 2A," http://dgsge.en.alibaba.com/product/955748375-218891485/Foldable_pins_UK_USB_charger_adaptor_2A.html, downloaded May 29, 2014, 2 pages.

*Primary Examiner* — Ross Gushi
(74) *Attorney, Agent, or Firm* — Kilpatrick Townsend & Stockton LLP

(57) ABSTRACT

An electrical power adapter employs a magnetically coupled mechanism to retract and deploy prongs used to interface with an electrical receptacle. The magnetically coupled mechanism is linearly displaced by a user, converting the linear displacement to rotary motion, pivoting the retractable prongs between a deployed position and a retracted position. When the retractable prongs are in the deployed position the adapter may be mated with a receptacle and when in the retracted position the adapter has a reduced physical size.

20 Claims, 6 Drawing Sheets

(56) References Cited

U.S. PATENT DOCUMENTS

| | | | |
|---|---|---|---|
| 6,840,784 B2* | 1/2005 | Chang | 439/131 |
| 7,001,196 B1* | 2/2006 | Huang | 439/320 |
| 7,052,298 B1* | 5/2006 | Cheng | 439/171 |
| 7,125,266 B1* | 10/2006 | Huang | 439/131 |
| 7,235,909 B2* | 6/2007 | Moe | 310/152 |
| 7,279,816 B2* | 10/2007 | Oikawa | 310/36 |
| 7,287,991 B1* | 10/2007 | Li | 439/131 |
| 7,311,533 B1* | 12/2007 | Lin et al. | 439/131 |
| 7,354,286 B1* | 4/2008 | Lee | 439/172 |
| 7,484,972 B1* | 2/2009 | Kuo et al. | 439/131 |
| 7,497,707 B2* | 3/2009 | Wu et al. | 439/172 |
| 7,503,779 B1* | 3/2009 | Yang et al. | 439/131 |
| 7,549,877 B1* | 6/2009 | Vista et al. | 439/172 |
| 7,604,492 B1* | 10/2009 | Wang | 439/131 |
| 7,614,892 B2* | 11/2009 | Klant et al. | 439/172 |
| 7,628,621 B2* | 12/2009 | Tsai | 439/131 |
| 7,638,968 B2* | 12/2009 | Inoue et al. | 320/107 |
| 7,787,238 B2* | 8/2010 | Liao et al. | 361/679.01 |
| 7,798,825 B1* | 9/2010 | Pai | 439/131 |
| 8,089,244 B2* | 1/2012 | Zhang et al. | 320/107 |
| 8,096,817 B2* | 1/2012 | Lee et al. | 439/104 |
| 8,182,274 B1* | 5/2012 | Cheng et al. | 439/131 |
| 8,226,424 B1* | 7/2012 | Wang et al. | 439/172 |
| 8,308,496 B2* | 11/2012 | Youssefi-Shams et al. | 439/172 |
| 8,366,461 B2* | 2/2013 | Lee et al. | 439/131 |
| 8,491,317 B2* | 7/2013 | Vardanyan | 439/131 |
| 8,508,089 B2* | 8/2013 | Edwards et al. | 310/80 |
| 8,593,007 B2* | 11/2013 | Hochberg et al. | 290/54 |
| 8,622,758 B2* | 1/2014 | Hsu et al. | 439/131 |
| 8,734,168 B2* | 5/2014 | Lee et al. | 439/95 |
| 8,777,644 B2* | 7/2014 | Pai | 439/131 |
| 8,786,141 B2* | 7/2014 | Wilson | 310/12.01 |
| 8,790,124 B2* | 7/2014 | Lee et al. | 439/131 |
| 8,979,549 B2* | 3/2015 | Lin | 439/31 |
| 2002/0090848 A1* | 7/2002 | Yu | 439/131 |
| 2002/0137387 A1* | 9/2002 | Lin | 439/446 |
| 2002/0151199 A1* | 10/2002 | Yao | 439/131 |
| 2002/0173183 A1* | 11/2002 | Segawa et al. | 439/131 |
| 2003/0181082 A1* | 9/2003 | Wu | 439/131 |
| 2004/0097114 A1* | 5/2004 | Shiroshita et al. | 439/174 |
| 2004/0209499 A1* | 10/2004 | Chung | 439/131 |
| 2004/0209500 A1* | 10/2004 | Chang | 439/131 |
| 2005/0106908 A1* | 5/2005 | Sakai | 439/131 |
| 2005/0287827 A1* | 12/2005 | Liao | 439/11 |
| 2006/0089026 A1* | 4/2006 | Song | 439/131 |
| 2007/0210659 A1* | 9/2007 | Long | 310/80 |
| 2008/0289440 A1* | 11/2008 | Denk et al. | 74/89.34 |
| 2008/0303365 A1* | 12/2008 | Tkadlec | 310/80 |
| 2009/0093163 A1* | 4/2009 | Tsai | 439/620.21 |
| 2011/0097914 A1* | 4/2011 | Lee et al. | 439/174 |
| 2013/0040479 A1* | 2/2013 | Hsu | 439/171 |
| 2013/0316553 A1* | 11/2013 | Lee | 439/131 |
| 2015/0118873 A1* | 4/2015 | Loh et al. | 439/131 |

* cited by examiner

MAGNETIC ROTATION ACTUATOR

FIELD

The present invention relates generally to electrical power adapters and in particular to electrical power adapters for use with standard alternating current (AC) power sockets employed in residential and commercial buildings.

BACKGROUND

Electrical power adapters are used for a wide variety of applications, facilitating the supply of electrical power to a myriad of electronic devices including smart-phones, media players, and other personal electronic systems.

As smart-phones, media players, and other electronic systems become more compact, a limiting factor on the size of the package in which the systems are shipped and sold may be the size of the electrical power adapter used to charge the electronic system. As an example, a portable media player may be packaged along with a BS1363 (Type G) electrical power adapter, used in the United Kingdom, where the media player is actually smaller than the electrical power adapter. Such large power adapters may therefore contribute to increased shipping costs for the electrical systems and may also be difficult for the user to conveniently store and transport.

New electrical power adapters may require new features to reduce their physical size, enabling reduced shipping costs and added convenience for the user.

SUMMARY

Embodiments of the invention pertain to electrical power adapter connectors for use with a variety of electronic devices. In some embodiments, the electrical power adapter connectors are configured to provide reduced size and improved usability. A reduction in size allows for a reduction in total packaging, which may enable lower packaging and/or shipping costs.

Some embodiments of the present invention relate to improved electrical power adapter connectors having retractable prongs that are pivoted from a retracted position in which the retractable prong is positioned adjacent to the adapter housing, to a deployed position in which the retractable prong extends away from the adapter housing, and can be inserted into an electrical outlet.

One particular embodiment employs a magnetic drive mechanism positioned within the adapter housing and operatively coupled to rotate the retractable prong between the refracted position and the deployed position. The magnetic drive mechanism includes a first and second driver magnet spaced a first axial distance apart that interact with first and second driven magnets attached to a rotatable shaft fixed to the rotatable prong. The magnetic drive mechanism is axially displaced by the user from a first position in which the first driver magnet is adjacent to the first driven magnet and the second driver magnet is displaced from the second driven magnet, to a second position in which the second driver magnet is adjacent to the second driven magnet and the first driver magnet is displaced from the first driven magnet. The driver and driven magnets are operatively coupled such that when the magnetic drive mechanism moves from the first position to the second position, the retractable prong is pivoted to the retracted position, and when the magnetic drive mechanism moves from the second position to the first position the retractable prong is pivoted to the deployed position.

In further embodiments, the retractable prong may be operatively coupled to a second rotatable shaft such that when one shaft rotates, both shafts rotate. Second rotatable shaft may be secured to one or more additional prongs such that when one prong is deployed or refracted, all prongs are deployed or retracted. In some embodiments there may be additional rotatable shafts that are operatively coupled to the retractable prong.

Other embodiments may incorporate a magnetic actuation mechanism and a rotatable carriage attached to a prong that is pivotable between a deployed and a retracted position. Rotatable carriage comprises first and second driven magnets spaced an axial distance apart. The magnetic actuation mechanism is positioned within the housing and operatively coupled to rotate the retractable prong between the refracted position and the deployed position. The magnetic actuation mechanism includes first and second driver magnets spaced a second axial distance apart and attached to a shaft. The shaft is axially moved by the user from a first position in which the first driver magnet is adjacent to the first driven magnet and the second driver magnet is displaced from the second driven magnet, to a second position in which the second driver magnet is adjacent to the second driven magnet and the first driver magnet is displaced from the first driven magnet. When the magnetic actuation mechanism moves from the first position to the second position, the retractable prong is pivoted to the retracted position, and when the magnetic actuation mechanism moves from the second position to the first position, the retractable prong is pivoted to the deployed position.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Certain embodiments of the present invention relate to electrical power adapters. While the present invention can be useful for a wide variety of electrical power adapters, some embodiments of the invention are particularly useful for electrical power adapters that can be reduced in size, as described in more detail below.

Figure 1:
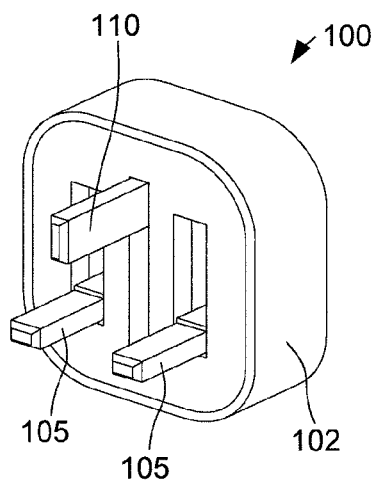
FIG. 1 is a front perspective view of an electrical power adapter in a deployed position according to some embodiments.

Many electronic devices such as smart-phones, media players, and tablet computers have electrical power adapters that facilitate battery charging. As an example, a three prong power adapter 100 compatible with the BS1363 (Type G) standard in the United Kingdom is illustrated in FIG. 1. Power adapter 100 has three rectangular prongs forming an isosceles triangle and extending away from housing 102. Line and neutral prongs 105 are approximately 4 mm by 8 mm and 17.7 mm long, on centers spaced 22.2 mm apart. Earth prong 110 is approximately 4 mm by 8 mm and 22.7 mm long. In other embodiments power adapters having different physical shapes and dimensions may be used.

Figure 2:
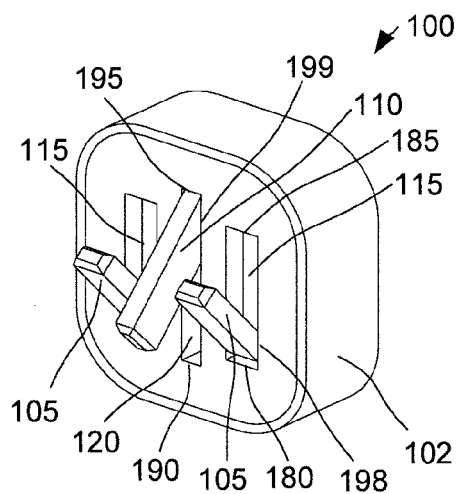
FIG. 2 is a front perspective view of an electrical power adapter transitioning between a deployed position and a retracted position according to some embodiments.
Figure 3:
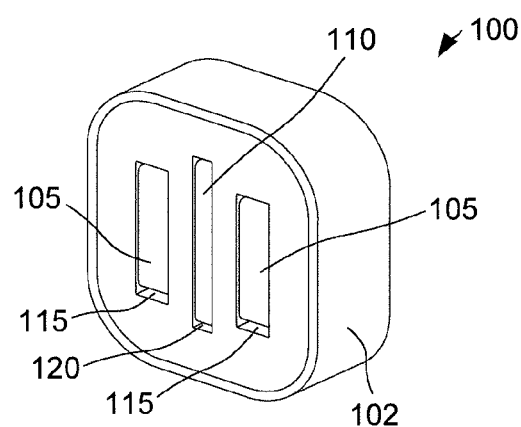
FIG. 3 is a front perspective view of an electrical power adapter in a retracted position according to some embodiments.

In this embodiment, prongs 105, 110 may be rotatably retractable. FIG. 2 illustrates prongs 105, 110 in a partially retracted position. FIG. 3 illustrates prongs 105, 110 in a fully retracted position where they are adjacent housing 102. Further, in FIG. 3, prongs 105, 110 are stowed within line and neutral slots 115 and earth slot 120, respectively. Thus, power adapter 100 has reduced physical size in FIG. 3 where prongs 105, 110 are in the retracted position, rotated approximately 90 degrees, as compared to FIG. 1 where the prongs are in the deployed position. As illustrated in FIG. 2, in some embodiments, pivot point 198 for line and neutral retractable prongs 105 is proximate a first end 180 of line and neutral slots 115 while pivot point 199 for earth prong 110 is proximate an end of earth slot 120 opposite the first end 180 of the line and neutral slots. Thus, in some embodiments, line and neutral prongs 105 may pivot in an opposite direction as ground prong 110. More specifically, as illustrated in FIG. 2, when transitioning from the deployed position to the refracted position, line and neutral prongs 105 may pivot up while ground prong 110 may pivot down.

Figure 4:
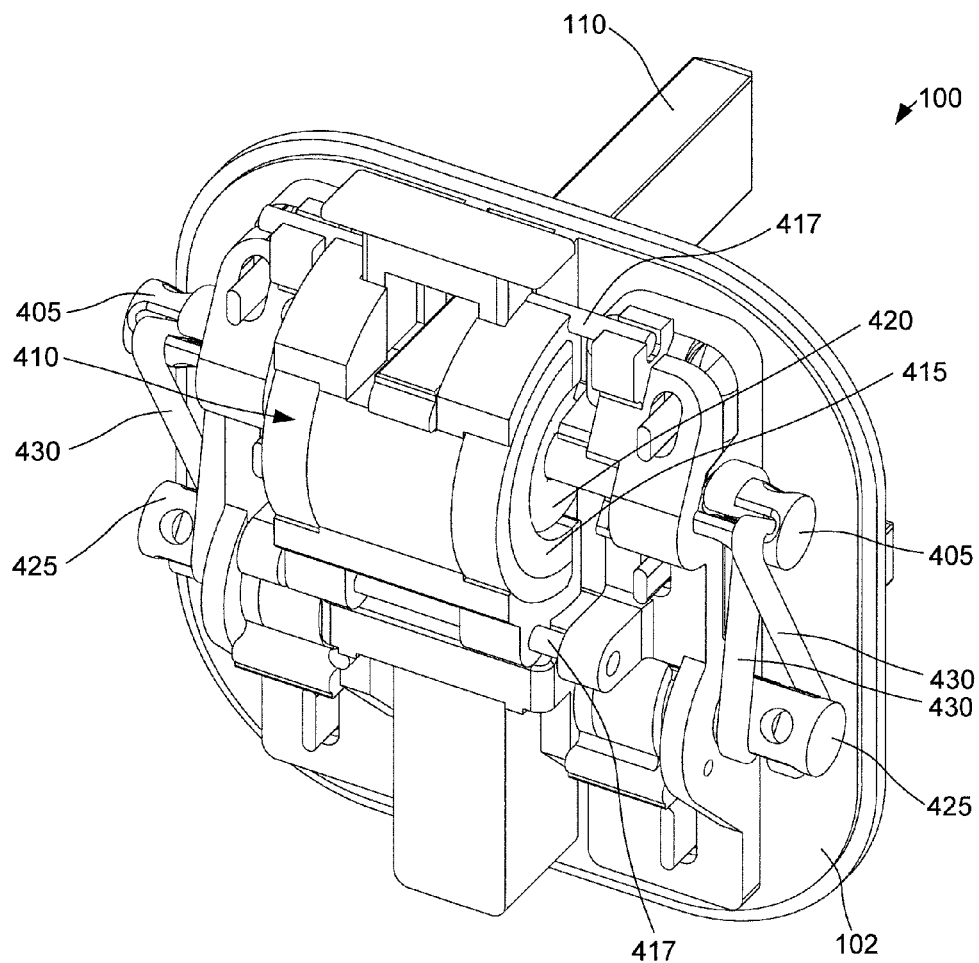
FIG. 4 is a rear perspective view of an electrical power adapter with a portion of the housing removed according to some embodiments.

FIG. 4 illustrates power adapter 100 with a portion of housing 102 removed, showing the internal construction of an embodiment. Retractable earth prong 110 is coupled to rotatable shaft 405 within housing 102 such that the retractable earth prong can be pivoted from a retracted position to a deployed position. Magnetic drive mechanism 410 is positioned within housing 102 and is operatively coupled to rotate retractable earth prong 110 between the retracted position and the deployed position. Magnetic drive mechanism 410 includes first driver magnet 415 and second driver magnet (not shown in FIG. 4) spaced a first axial distance apart (shown in greater detail in subsequent figures). First driven magnet 420 and second driven magnet (not shown in FIG. 4) are attached to rotatable shaft 405 and are spaced a second axial distance apart (shown in greater detail in subsequent figures).

An actuator (not shown) such as a depressible button or a slide, for example, may be operatively coupled to magnetic drive mechanism 410 to axially move the magnetic drive mechanism from a first position in which first driver magnet 415 is adjacent first driven magnet 420 (as shown in FIG. 4) and second driver magnet (not shown in FIG. 4) is displaced from second driven magnet (not shown in FIG. 4), to a second position in which the second driver magnet (not shown in FIG. 4) is adjacent to the second driven magnet (not shown in FIG. 4) and the first driver magnet is displaced from the first driven magnet. These configurations will be illustrated in greater detail in subsequent figures. Magnetic drive mechanism 410 may have one or more slides 417 that enable the drive mechanism to move in a rectilinear motion without rotating. Magnetic drive mechanism 410 may be magnetically coupled to rotatable shaft 405 such that when magnetic drive mechanism moves from the first position to the second position, retractable earth prong 110 is pivoted to the refracted position and when the magnetic drive mechanism moves from the second position to the first position the retractable prong is pivoted to the deployed position (illustrated in FIG. 4).

Thus, the actuator is coupled to a magnetic actuation mechanism enabling a non-contact method of driving the retractable prongs of the power adapter. This drive mechanism offers a low friction, low wear system that may enable electrical isolation between components.

FIG. 4 also illustrates rotatable shaft 405 operably coupled to second rotatable shaft 425 with bands 430. Bands 430 transfer rotational motion from rotatable shaft 405 to second rotatable shaft 425, such that when retractable earth prong 110 moves between the retracted position and the deployed position, retractable line and neutral prongs 105 (see FIG. 1) similarly move between the retracted position and the deployed position, as illustrated in FIGS. 1-3.

Figure 5:
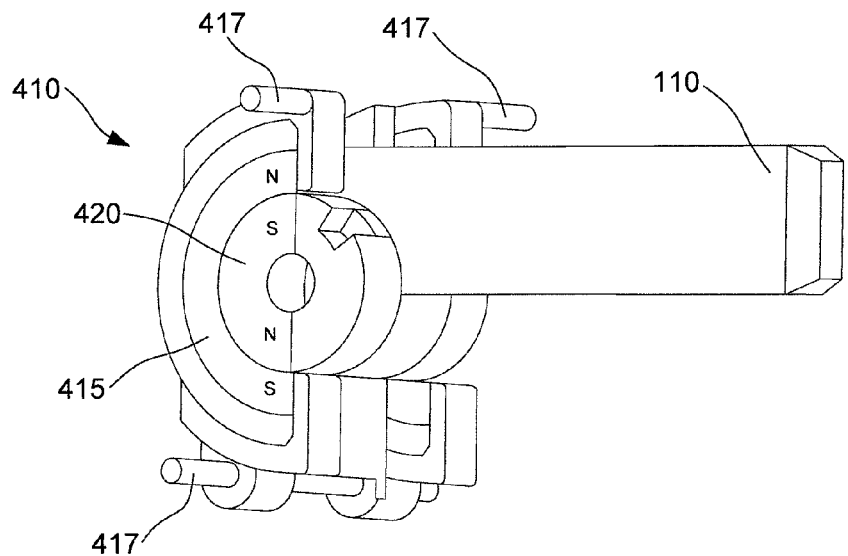
FIG. 5 is a left side perspective view of a magnetic drive mechanism and an electrical prong in a deployed position according to some embodiments.

FIG. 5 illustrates a left-side view of magnetic drive mechanism 410 in the first position and retractable earth prong 110, with housing 102 and rotatable shaft 405 removed for clarity. Retractable earth prong 110 is shown in the deployed position. First driver magnet 415 is adjacent first driven magnet 420. As used herein, adjacent means when the outer surfaces of the driver and driven magnets are approximately aligned, or approximately coplanar. When first driver magnet 415 and first driven magnet 420 are adjacent one another, magnetic forces from first driver magnet 415 magnetically attract first driven magnet 420 causing rotatable shaft 405 (see FIG. 4) to rotate in a first direction. As illustrated in FIG. 5 the first direction would be counter-clockwise if earth prong 110 is rotating from the retracted position to the deployed position. Rotatable shaft 405 is affixed to retractable earth prong 110 so when the rotatable shaft rotates the retractable earth prong deploys. Magnetic poles "N" and "S" are identified in FIG. 5 and are illustrated for example only; other orientations, configurations, quantities and numbers of magnets may be employed without departing from the invention. As known in the art, magnetic forces will cause the "N" pole of first driver magnet 415 to attract the "S" pole of first driven magnet 420. Similarly, magnetic forces will cause the "S" pole of first driver magnet 415 to attract the "N" pole of first driven magnet 420, engendering rotation of rotatable shaft 405 (see FIG. 4) and deployment of earth prong 110. In alternative embodiments repulsive forces (i.e., "N" to "N" and "S" to "S") may also be used to engender rotation of rotatable shaft 405 (see FIG. 4) and deployment of earth prong 110.

Figure 6:
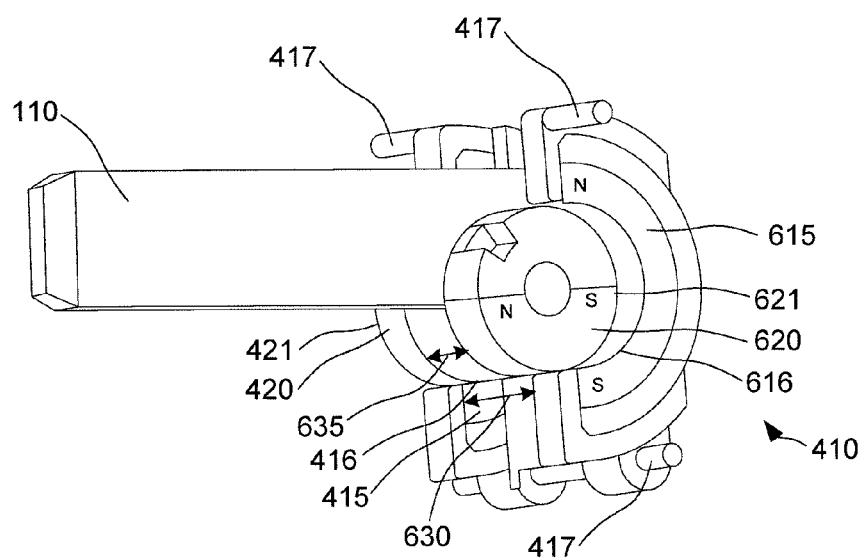
FIG. 6 is a right side perspective view of a magnetic drive mechanism and an electrical prong in a deployed position according to some embodiments.

FIG. 6 illustrates a right-side view of magnetic drive mechanism 410 in the first position and retractable earth prong 110, with housing 102 and rotatable shaft 405 removed for clarity. Retractable earth prong 110 is shown in the deployed position and magnetic drive mechanism 410 is in the first position. Second driver magnet 615 is displaced from first driven magnet 620. As used herein, displaced means when the outer surfaces of magnets are not aligned or they are not coplanar. When magnets 615, 620 are displaced, magnetic forces from second driver magnet 615 have very little magnetic attraction to second driven magnet 620. Thus, when magnetic drive mechanism 410 is in the first position, the magnetic forces between first driver magnet 415 and first driven magnet 420 (see FIG. 5) are much stronger than the magnetic forces between second driver magnet 615 and second driven magnet 620. In some embodiments the magnetic surface area of the magnets may be increased to increase magnetic forces by fabricating the magnets in an arcuate geometry as shown. More specifically, FIG. 6 illustrates all magnets having an arcuate shape wherein first and second driven magnets 420, 620 have outer radii 421, 621, respectively, that are smaller than inner radii 416, 616 of first and second driver magnets 415, 615, respectively.

As further illustrated in FIG. 6, first axial distance 630 from first driver magnet 415 to second driver magnet 615 is greater than a second axial distance 635 between first driven magnet 420 and second driven magnet 620. The difference between axial distances 630, 635 is such that either first driver magnet 415 and first driven magnet 420 are aligned (in a first position of magnetic drive mechanism 410 illustrated in FIG. 5) or second driver magnet 615 and second driven magnet 620 are aligned (in a second position of magnetic drive mechanism 410 illustrated in FIG. 6). In other embodiments first axial distance 630 may be less than second axial distance 635.

Figure 7:
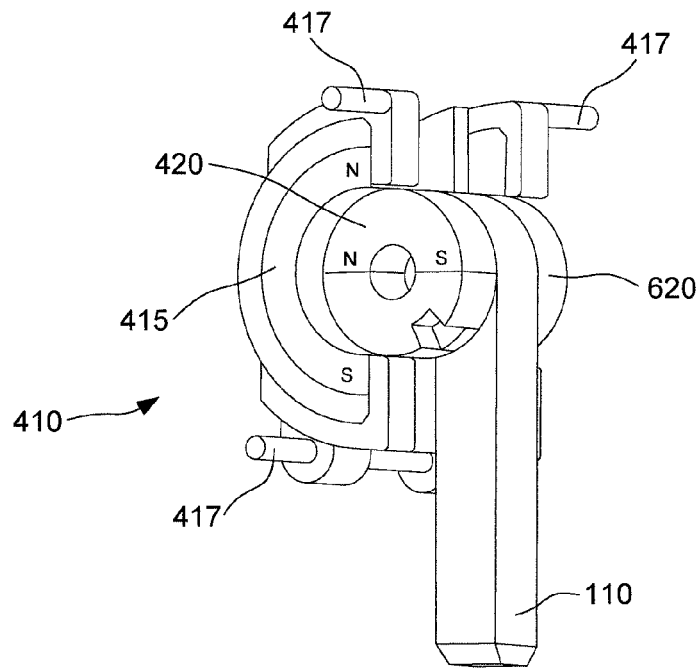
FIG. 7 is a left side perspective view of a magnetic drive mechanism and an electrical prong in a retracted position according to some embodiments.

FIG. 7 illustrates a left-side view of magnetic drive mechanism 410 in the second position and retractable earth prong 110, with housing 102 and rotatable shaft 405 removed for clarity. Retractable earth prong 110 is shown in the retracted position and magnetic drive mechanism 410 is in the second position. First driver magnet 415 is displaced from first driven magnet 420. When magnets 415, 420 are displaced from one another, second driver magnet 415 has very little magnetic attraction to second driven magnet 420.

Figure 8:
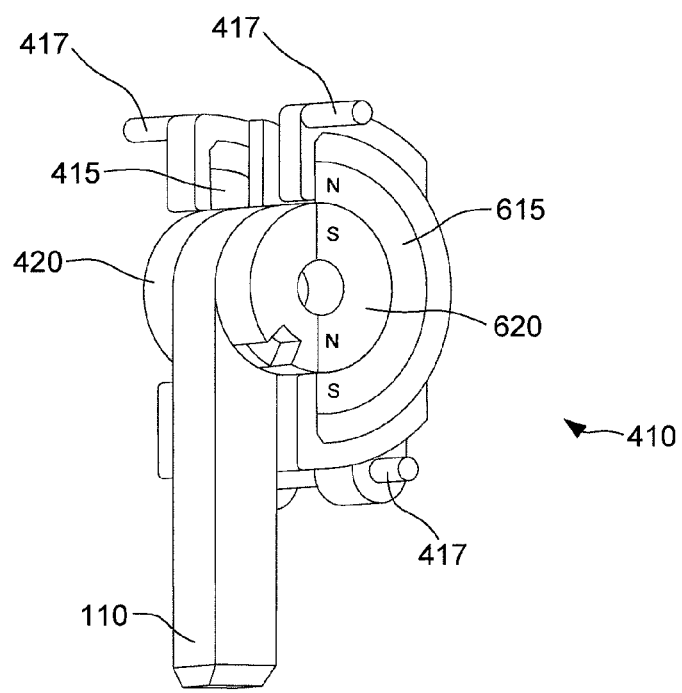
FIG. 8 is a right side perspective view of a magnetic drive mechanism and an electrical prong in a retracted position according to some embodiments.

FIG. 8 illustrates a right-side view of magnetic drive mechanism 410 in the second position and retractable earth prong 110, with housing 102 and rotatable shaft 405 removed for clarity. Retractable earth prong 110 is shown in the retracted position and magnetic drive mechanism 410 is in the second position. Second driver magnet 615 is adjacent second driven magnet 620. When magnets 615, 620 are adjacent one another, magnetic forces from first driver magnet 615 magnetically attract first driven magnet 620 causing rotatable shaft 405 (see FIG. 4) to rotate in a second direction. As illustrated in FIG. 7 the second direction would be clockwise if earth prong 110 is rotating from the deployed position to the retracted position. Thus, when magnetic drive mechanism 410 is in the second position, the magnetic forces between second driver magnet 615 and second driven magnet 620 are much stronger than the magnetic forces between first driver magnet 415 and first driven magnet 420. Magnetic poles "N" and "S" are identified and are illustrated for example only; other orientations, configurations, quantities and numbers of magnets may be used without departing from the invention. As known in the art, magnetic forces will cause the "N" pole of second driver magnet 615 to attract the "S" pole of second driven magnet 620. Similarly, magnetic forces will cause the "S" pole of second driver magnet 615 to attract the "N" pole of second driven magnet 620. In alternative embodiments repulsive forces may be used to engender rotation of rotatable shaft 405 (see FIG. 4).

FIGS. 9 through 12 illustrate various example configurations of driver magnets and driven magnets. These are illustrative examples only and in no way limit the scope of the invention. For example, the driven magnets do not need to be disposed within the inner radius of the driver magnets. The driver magnets may be larger and be disposed outside of the radius of the driver magnets. Further, the driver and driven magnets do not need to be nested as illustrated in FIGS. 9 through 12, but they may be axially displaced (e.g., the driver and driven magnets may be approximately the same size and may both be disposed on the same axis where they may be axially adjacent to one another. Myriad configurations, geometric orientations and quantities of driver and driven magnets may be used without departing from the invention. Additionally, the configuration of the poles in FIGS. 9 through 12 are for example only and other configurations of the poles are within the scope of the invention.

Figure 9:
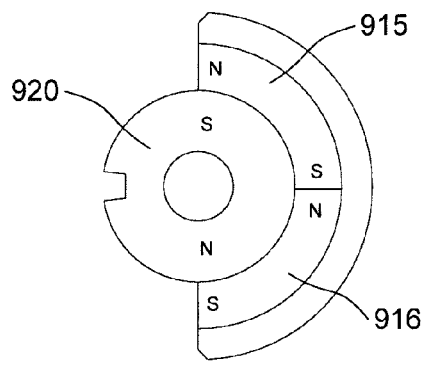
FIG. 9 is a plan view of driver and driven magnets according to some embodiments.
Figure 10:
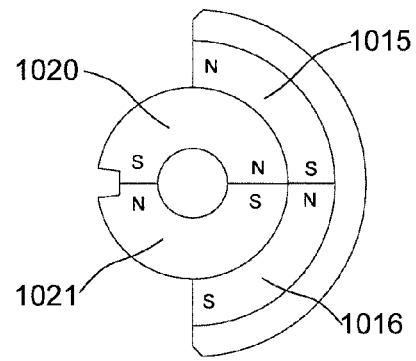
FIG. 10 is a plan view of driver and driven magnets according to some embodiments.
Figure 11:
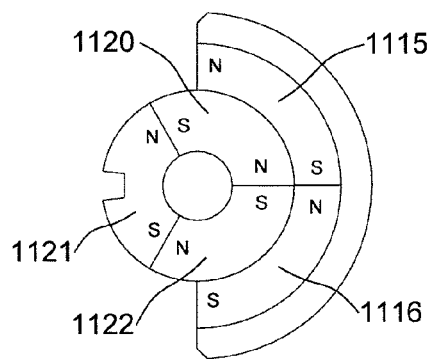
FIG. 11 is a plan view of driver and driven magnets according to some embodiments
Figure 12:
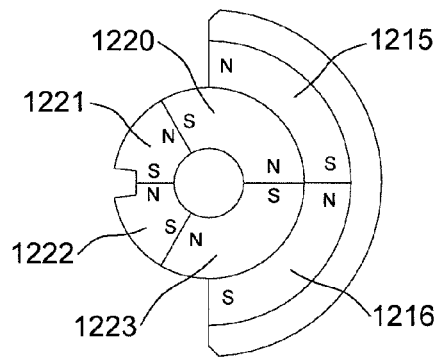
FIG. 12 is a plan view of driver and driven magnets according to some embodiments.

In some embodiments, various orientations and quantities of driver and driven magnets may be used to change the way in which retractable earth prong 110 moves, and may also be used to apply a preload to the prong. Additional magnets may be used to alter the magnetic forces between the driver and driven magnets to change the way in which the retractable prongs move in relationship to the change in position of the actuation mechanism. In other embodiments a the additional magnets may be used to apply a preload to the prongs. FIG. 9 illustrates an embodiment having two driver magnets 915, 916 and one driven magnet 920. FIG. 10 illustrates an embodiment having two driver magnets 1015, 1016 and two driven magnets 1020, 1021. FIG. 11 illustrates an embodiment having two driver magnets 1115, 1116 and three driven magnets 1120, 1121, 1122. FIG. 12 illustrates an embodiment having two driver magnets 1215, 1216 and four driven magnets 1220, 1221, 1222, 1223. A prong preload may be used to secure retractable earth prong 110 in the deployed or retracted positions where the prong rests against a hard stop. The preload may be used to ensure that while in the deployed position, retractable earth prong 110 is positioned against a hard stop for accurate alignment. The preload magnitude may also be sufficient to prevent unintended rotation of the prong when inadvertent external forces act on the prong (e.g., when a user misses the holes in the receptacle connector). A preload in the retracted position may ensure the prong is held firmly against a hard stop to mitigate vibration or rattling of the prong during transport of power adapter 100 (see FIG. 3).

Figure 13:
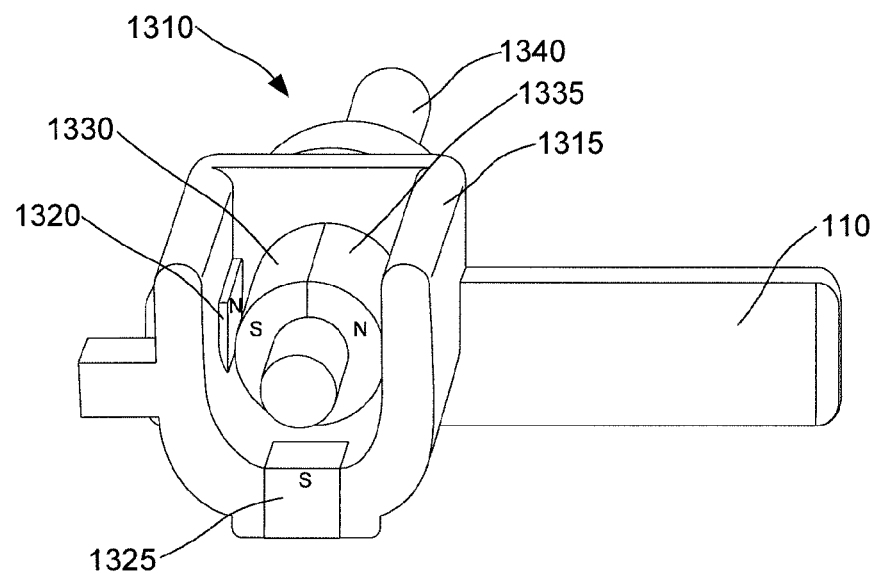
FIG. 13 is a left side perspective cross-section of a magnetic actuation mechanism and a carrier in a deployed position according to some embodiments.
Figure 14:
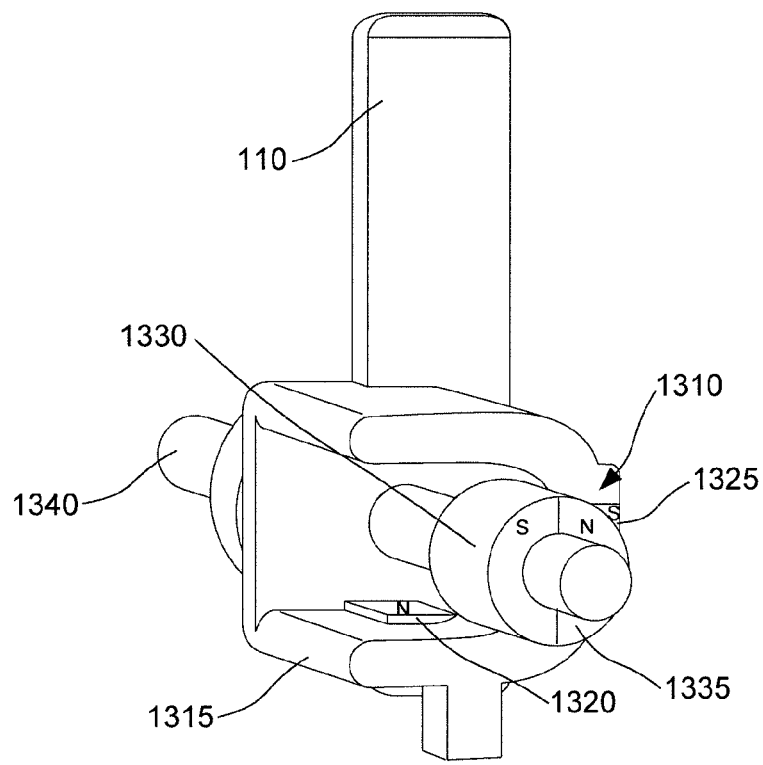
FIG. 14 is a left side perspective cross-section of a magnetic actuation mechanism and a carrier in a retracted position according to some embodiments.

Other embodiments may incorporate a magnetic actuation mechanism 1310 and a rotatable carriage 1315, as illustrated in FIGS. 13 and 14. FIG. 13 illustrates a left-side cross-sectional perspective view of magnetic actuation mechanism 1310 in a first position, and rotatable carriage 1315 and retractable earth prong 110, with housing 102 (see FIG. 1) removed for clarity.

FIG. 14 illustrates a left-side perspective cross-sectional view of magnetic actuation mechanism 1310 in the second position, rotatable carriage 1315 and retractable earth prong 110, with housing 102 (see FIG. 1) removed for clarity. FIG. 13 illustrates retractable earth prong 110 in the deployed position whereas FIG. 14 illustrates retractable earth prong 110 in the retracted position. Retractable prong 110 is coupled to rotatable carriage 1315 within housing 102 such that the retractable prong can be pivoted from a retracted position in which the retractable prong is positioned adjacent to housing (see FIG. 3), to a deployed position in which the retractable prong extends away from the housing (see FIG. 1), and can be inserted into an electrical outlet.

Rotatable carriage 1315 further comprises a first driven magnet 1320 and second driven magnet 1325 attached to the rotatable carriage and spaced an axial distance apart. Magnetic actuation mechanism 1310 is positioned within housing 102 (see FIG. 1) and operatively coupled to rotate retractable prong 110 between the retracted position and the deployed position. Magnetic actuation mechanism 1310 includes first driver magnet 1330 and second driver magnet 1335 attached to shaft 1340. An actuator (not shown) may be operatively coupled to shaft 1340 to axially move the shaft and first and second driver magnets 1330, 1335, respectively, from a first position (see FIG. 13) in which first driver magnet 1330 is adjacent to first driven magnet 1320 and second driver magnet 1335 is displaced from second driven magnet 1325, to a second position (see FIG. 14) in which second driver magnet 1335 is adjacent to second driven magnet 1325 and first driver magnet 1330 is displaced from first driven magnet 1320. More specifically, when magnetic actuation mechanism 1310 moves from the first position to the second position, retractable prong 110 is pivoted to the retracted position and when the magnetic actuation mechanism moves from the second position to the first position, the retractable prong is pivoted to the deployed position. In some embodiments an actuator may comprise a button or a lever.

In some embodiments, driver and driven magnets are arcuate as illustrated previously, however in other embodiments they may comprise other shapes. As illustrated in FIG. 13, driven magnets may be parallelepipeds while other embodiments may employ different shapes. In further embodiments, earth prong 110 may not be the driven prong and the line and/or neutral prongs may be the driven prong. In other embodiments all prongs may be driven prongs.

It will be appreciated that the magnetic actuation mechanism described herein is illustrative and that variations and modifications are possible. For instance, referring back to FIG. 4, magnetic drive mechanism 410 may be employed in a myriad of applications such as a door latch, a valve positioner, an electronic switch or other application where a translation to rotation or rotation to translation mechanism may be employed. For example, rotatable shaft 405 may be coupled to a rotatable door knob and actuation mechanism 410 may be coupled to a linearly retractable door latch. A user may rotate the door knob causing rotatable shaft 405 to rotate and in turn causing magnetic actuation mechanism 410 to linearly displace, engaging or disengaging a door latch. In further embodiments, actuation mechanism 410 may be coupled to a translatable button, and rotatable shaft 405 may be coupled to an electronic switch or a valve having one or more positions. When a user translates the button, the switch or valve may be rotated to one or more new positions. Other applications are within the scope of the invention where such a low friction, non-directly coupled, back drivable translation/rotation mechanism may be employed. Actuation mechanism 410 may have multiple linear positions and rotatable shaft 405 may have multiple associated linear positions. The non-directly coupled nature of the mechanism may be beneficial where electronic isolation is desired.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A power adapter comprising:
   an adapter housing;
   a retractable prong coupled to a rotatable shaft within the housing such that the retractable prong can be pivoted from a retracted position in which the retractable prong is positioned adjacent to the housing, to a deployed position in which the retractable prong extends away from the housing, and can be inserted into an electrical outlet;
   a magnetic drive mechanism positioned within the housing and operatively coupled to rotate the retractable prong between the retracted position and the deployed position, the magnetic drive mechanism including a first and second driver magnet spaced a first axial distance apart, a first and second driven magnet attached to the rotatable shaft and spaced a second axial distance apart;
   an actuator operatively coupled to the magnetic drive mechanism to axially move the magnetic drive mechanism from a first position in which the first driver magnet is adjacent to the first driven magnet and the second driver magnet is displaced from the second driven magnet, to a second position in which the second driver magnet is adjacent to the second driven magnet and the first driver magnet is displaced from the first driven magnet, wherein when the magnetic drive mechanism moves from the first position to the second position the retractable prong is pivoted to the retracted position and when the magnetic drive mechanism moves from the second position to the first position the retractable prong is pivoted to the deployed position.

2. The power adapter of claim 1 wherein the first axial distance and the second axial distance are different such that either the first driver magnet and the first driven magnets are aligned or the second driver magnet and the second driven magnets are aligned.

3. The power adapter of claim 1 wherein the retractable prong pivots approximately 90 degrees between the retracted position and the deployed position.

4. The power adapter of claim 1 wherein the first and second driver magnets each comprise a plurality of magnets.

5. The power adapter of claim 1 wherein the first and second driven magnets each comprise a plurality of magnets.

6. The power adapter of claim 1 wherein the rotatable shaft is operably coupled to a second rotatable shaft that is coupled to a second retractable prong such that when the retractable prong moves between the retracted position and the deployed position the second retractable prong similarly moves between the retracted position and the deployed position.

7. The power adapter of claim 1 wherein the actuator comprises a depressible button.

8. The power adapter of claim 1 wherein the actuator comprises a slidable actuator.

9. A linear to rotary motion conversion mechanism comprising:
   a magnetic drive mechanism having a first and second driver magnet spaced a first axial distance apart, the drive mechanism moveable along an axis from a first position to a second position;
   a rotatable shaft having a first and second driven magnet spaced a second axial distance apart and operatively coupled to the drive mechanism such that when the drive mechanism is in the first position the first driver magnet is adjacent to the first driven magnet and the second driver magnet is displaced from the second driven magnet, and when the drive mechanism is moved to the second position the first driver magnet is displaced from the first driven magnet and the second driver magnet is aligned with the second driven magnet wherein the second driver magnet magnetically attracts the second driven magnet causing the rotatable shaft to rotate in a first direction.

10. The mechanism of claim 9 wherein the first and second driver magnets and the first and second driven magnets are arcuate.

11. The mechanism of claim 10 wherein the first and second driven magnets have an outer radius that is smaller than an inner radius of the first and second driver magnets.

12. The mechanism of claim 9 wherein the drive mechanism and the rotatable shaft are axially aligned.

13. The mechanism of claim 9 wherein the first and second driver magnets each comprise a plurality of magnets.

14. The mechanism of claim 9 wherein the first and second driven magnets each comprise a plurality of magnets.

15. The mechanism of claim 9 wherein the first axial distance and second axial distance are different such that either the first driver magnet and the first driven magnets are aligned or the second driver magnet and the second driven magnets are aligned.

16. The mechanism of claim 9 wherein when the drive mechanism is moved from the second position to the first position the second driver magnet is displaced from the second driven magnet and the first driver magnet is aligned with the first driven magnet wherein the first driver magnet magnetically attracts the first driven magnet causing the rotatable shaft to rotate in a second direction that is opposite the first direction.

17. A power adapter comprising:
 an adapter housing;
 a retractable prong coupled to a rotatable carriage within the housing such that the retractable prong can be pivoted from a retracted position in which the retractable prong is positioned adjacent to the housing, to a deployed position in which the retractable prong extends away from the housing, and can be inserted into an electrical outlet, the rotatable carriage further comprising a first and second driven magnet attached to the rotatable carriage and spaced an axial distance apart;
 a magnetic actuation mechanism positioned within the housing and operatively coupled to rotate the retractable prong between the retracted position and the deployed position, the magnetic actuation mechanism including a first and second driver magnet attached to a shaft;
 an actuator operatively coupled to the shaft to axially move the shaft and the first and second driver magnets from a first position in which the first driver magnet is adjacent to the first driven magnet and the second driver magnet is displaced from the second driven magnet, to a second position in which the second driver magnet is adjacent to the second driven magnet and the first driver magnet is displaced from the first driven magnet, wherein when the magnetic actuation mechanism moves from the first position to the second position the retractable prong is pivoted to the retracted position and when the magnetic actuation mechanism moves from the second position to the first position the retractable prong is pivoted to the deployed position.

18. The power adapter set forth in claim 17 wherein the adapter housing further comprises a first slot that accommodates the retractable prong in the retracted position.

19. The power adapter set forth in claim 18 wherein the adapter further comprises a second and third retractable prong and the housing further comprises a second and third slot that accommodate the second and third retractable prongs.

20. The power adapter set forth in claim 19 wherein a pivot point for the first retractable prong is at one end of the first slot while a pivot point for the second and third retractable prongs are at an end of the second and third slots opposite the one end.

\* \* \* \* \*